(12) United States Patent
Hashimoto

(10) Patent No.: US 11,264,926 B2
(45) Date of Patent: Mar. 1, 2022

(54) DRIVING CIRCUIT AND METHOD FOR STEPPING MOTOR

(71) Applicant: ROHM CO., LTD., Kyoto (JP)

(72) Inventor: Hiroki Hashimoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 43 days.

(21) Appl. No.: 16/816,842

(22) Filed: Mar. 12, 2020

(65) Prior Publication Data

US 2020/0295684 A1    Sep. 17, 2020

(30) Foreign Application Priority Data

Mar. 13, 2019    (JP) .............................. JP2019-045874

(51) Int. Cl.
| | | |
|---|---|---|
| *H02P 8/00* | (2006.01) | |
| *H02P 8/12* | (2006.01) | |
| *H02P 8/34* | (2006.01) | |

(52) U.S. Cl.
CPC . *H02P 8/12* (2013.01); *H02P 8/34* (2013.01)

(58) Field of Classification Search
CPC ..................................... H02P 8/12; H02P 8/34
USPC ......................................................... 318/696
See application file for complete search history.

(56) References Cited

U.S. PATENT DOCUMENTS

| | | | | | |
|---|---|---|---|---|---|
| 5,084,661 | A | * | 1/1992 | Tanaka ............... | G11B 7/08517 318/685 |
| 5,296,792 | A | * | 3/1994 | Knierim ................... | H02P 7/04 318/400.4 |
| 6,288,507 | B1 | * | 9/2001 | Makino ..................... | H02P 7/29 318/292 |
| 8,072,177 | B2 | * | 12/2011 | Arisawa ................... | H02P 8/34 318/685 |
| 2009/0153093 | A1 | * | 6/2009 | Pinewski ................. | H02P 8/36 318/696 |
| 2015/0244176 | A1 | * | 8/2015 | Van Den Brink ... | H04B 5/0037 307/104 |

FOREIGN PATENT DOCUMENTS

| | | |
|---|---|---|
| JP | H09103096 A | 4/1997 |
| JP | 2000184789 A | 6/2000 |
| JP | 2004120957 A | 4/2004 |
| JP | 2004180354 a | 6/2004 |
| JP | 6258004 B2 | 1/2018 |

* cited by examiner

*Primary Examiner* — Erick D Glass
(74) *Attorney, Agent, or Firm* — Cantor Colburn LLP

(57) ABSTRACT

Excitation position is changed in accordance with an external clock. The state of a full bridge circuit including four transistors connected to a coil of a stepping motor, is controlled in accordance with the excitation position. At the time of transition from the excitation position at which coil current that flows in the coil is nonzero to the excitation position at which the coil current is zero, a switch is made to (i) the inverse state where the on or off state of each of the four transistors before the transition is inverted, and then a switch is made to (ii) the off state where all the four transistors are off.

7 Claims, 13 Drawing Sheets

EXCITATION POSITION #1

EXCITATION POSITION #2

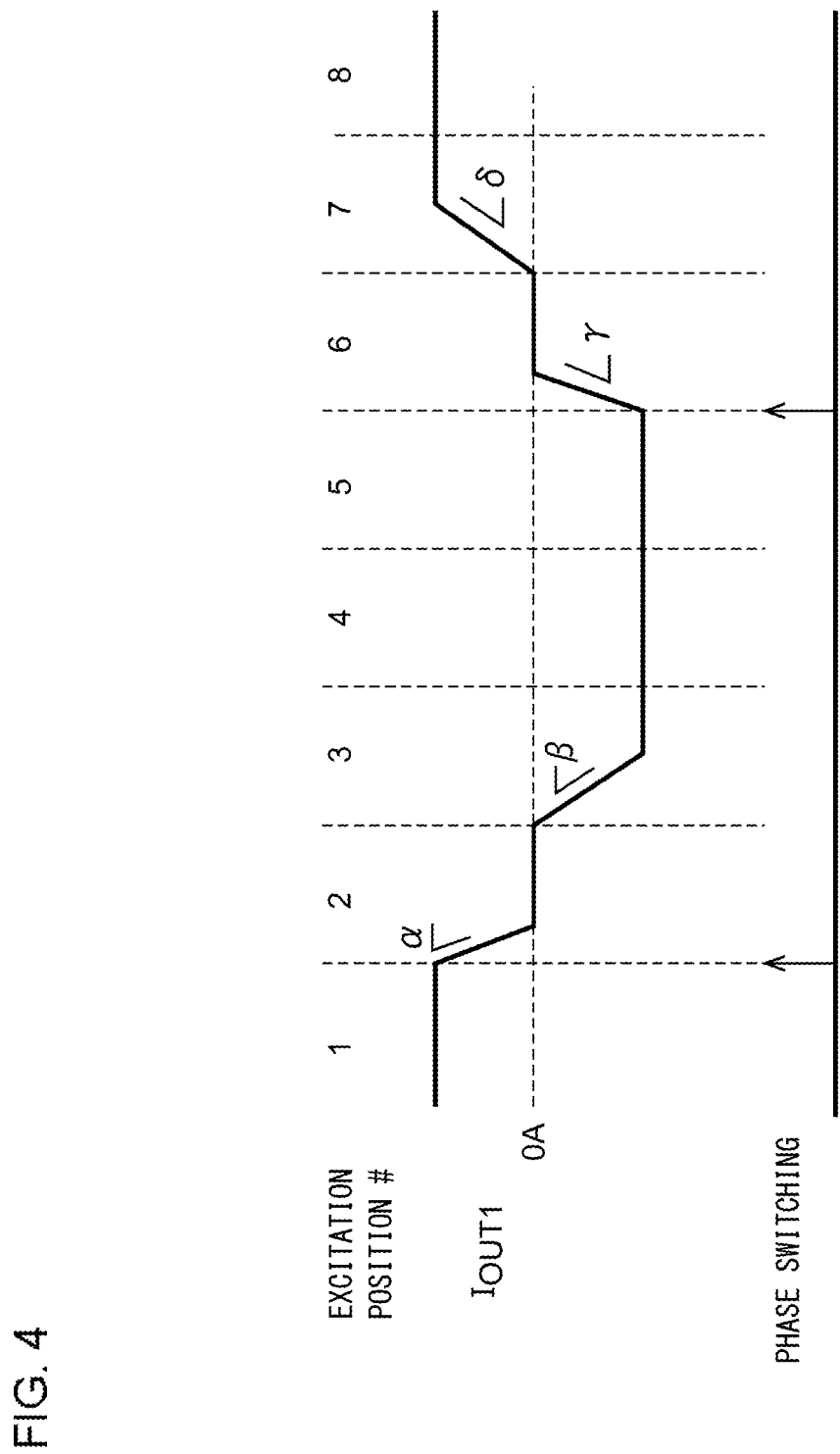

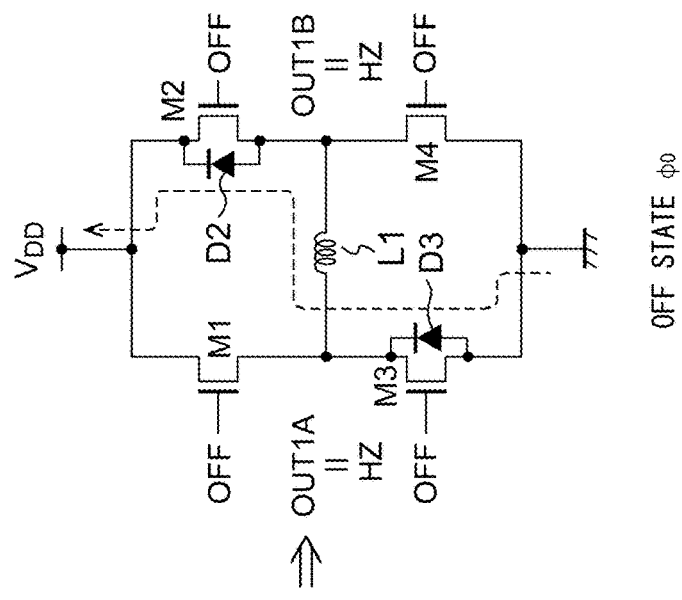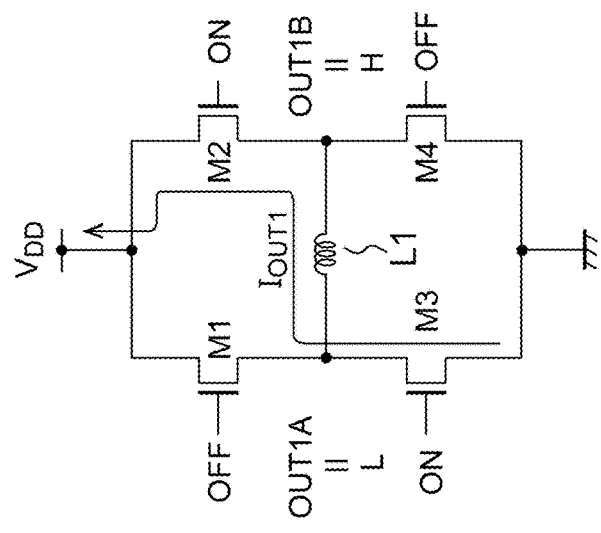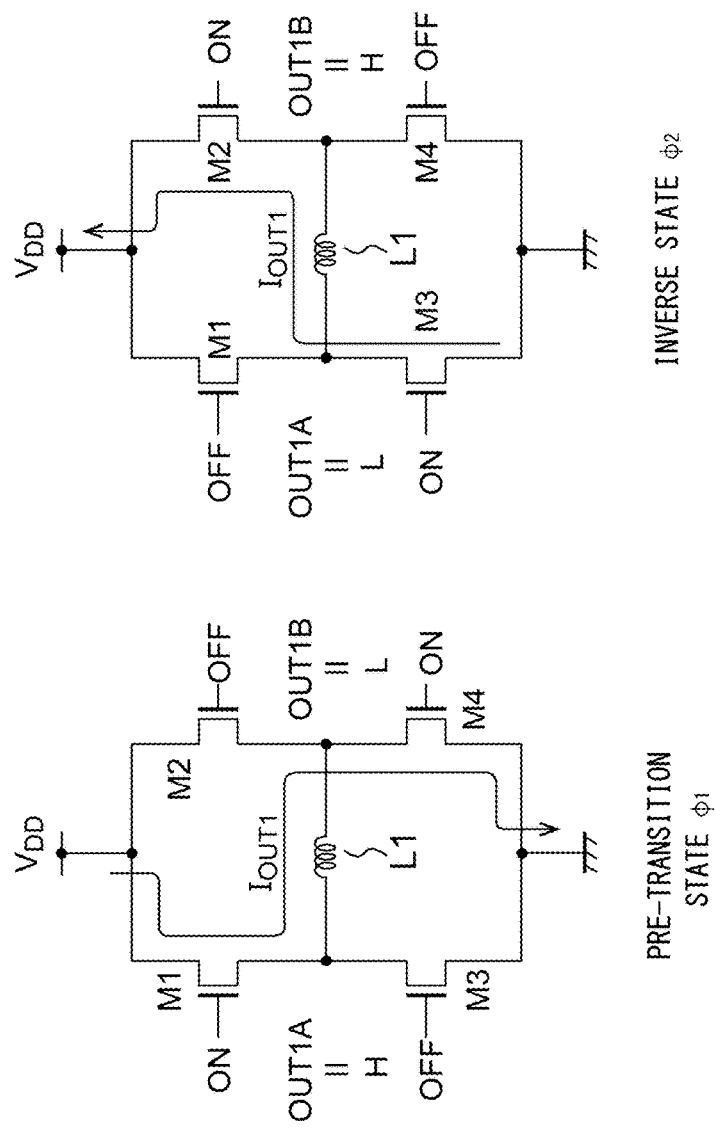

DRIVING CIRCUIT AND METHOD FOR STEPPING MOTOR

CROSS REFERENCE FOR RELATED APPLICATIONS

The present invention claims priority under 35 U.S.C. § 119 to Japanese Application No. 2019-045874 filed Mar. 13, 2020, the entire content of which is incorporated herein by reference.

BACKGROUND OF THE INVENTION

1. Field of the Invention

The present invention relates to driving technology for a stepping motor.

2. Description of the Related Art

Stepping motors have been widely adopted in electronic equipment, industrial machinery, and robots. Such a stepping motor is a synchronous motor that rotates in synchronization with an input clock generated by a host controller, and has excellent controllability in starting, stopping, and positioning. Furthermore, the stepping motor enables open-loop positional control, and is characteristically suitable for digital signal processing.

FIG. 1 is a block diagram of a motor system including a conventional stepping motor and a driving circuit therefor. A host controller 2 supplies an input clock CLK to the driving circuit 4. The stepping motor 6 includes a first coil L1 and a second coil L2. The position of a rotor in the stepping motor 6 is determined in accordance with the combination of electric currents $I_{OUT1}$ and $I_{OUT2}$ that flow in the first coil L1 and the second coil L2, respectively.

The driving circuit 4 includes full bridge circuits 8_1 and 8_2 connected with the first coil L1 and the second coil L2, respectively. The driving circuit 4 changes the respective states of the two full bridge circuits 8_1 and 8_2, in synchronization with the input clock CLK, so that the combination of the currents $I_{OUT1}$ and $I_{OUT2}$ (excitation position) is changed.

FIG. 2A explanatorily illustrates excitation position. The excitation position is grasped as the combination of the coil currents (driving currents) $I_{OUT1}$ and $I_{OUT2}$ that flow in the two coils L1 and L2 of the stepping motor 6. FIG. 2A illustrates eight excitation positions #1 to #8. In 1 phase excitation, alternate-current flows in the first coil L1 and the second coil L2 result in transition to excitation positions #2, #4, #6, and #8. In 2 phase excitation, simultaneous-current flows in the first coil L1 and the second coil L2 result in transition to excitation positions #1, #3, #5, and #7. In 1-2 phase excitation, the combination of the 1 phase excitation and the 2 phase excitation results in transition to excitation positions #1 to #8. In micro-step drive, further fine control is made in excitation position.

FIG. 2B is a waveform chart of the operation of the driving circuit in the 1-2 phase excitation. In this example, clockwise transition occurs sequentially to excitation positions #1 to #8 of FIG. 2A every one pulse of the clock CLK. The state of the full bridge circuit 8_1 is represented by OUT1A and OUT1B, and the state of the full bridge circuit 8_2 is represented by OUT2A and OUT2B. Specifically, the state of output of high voltage is represented by "H", the state of output of low voltage is represented by "L", and the state of high impedance is represented by "HZ".

The coil currents $I_{OUT1}$ and $I_{OUT2}$ each are inverted in direction (polarity) every four excitation positions. This phenomenon is referred to as phase switching. In FIG. 2B, the timing of phase switching is denoted with a circle.

The present inventor has recognized the following problem as a result of examination of the phase switching of the stepping motor.

Focus on the first coil L1. In FIG. 2B, the phase switching of the current $I_{OUT1}$ that flows in the first coil L1, occurs in the transition from excitation position #1 to excitation position #2 and in the transition from excitation position #5 to excitation position #6. FIG. 3A illustrates the state of the full bridge circuit 8_1 and the current $I_{OUT1}$ at excitation position #1, and FIG. 3B illustrates the state of the full bridge circuit 8_1 and the current $I_{OUT1}$ at excitation position #2.

As illustrated in FIG. 3A, the current $I_{OUT1}$ flows right in the first coil L1 at excitation position #1. The current $I_{OUT1}$ at this time is stabilized at a predetermined target amount. In response to the clock CLK, transition is made to excitation position #2 of FIG. 3B, so that the outputs OUT1A and OUT1B of the full bridge circuit 8_1 turn to high impedance. Then, the current $I_{OUT1}$ that flows in the first coil L1 flows in respective body diodes (flywheel diodes) connected in antiparallel with transistors, and attenuates with time, resulting in zero.

FIG. 4 is a waveform chart of the coil current $I_{OUT1}$. In the transition involving the phase switching (from excitation position #1 to excitation position #2 and from excitation position #5 to excitation position #6), the full bridge circuit 8_1 has high impedance at excitation positions (#2 and #6) as the destination of transition. Thus, no driving voltage is applied across the coil L1, and the coil current $I_{OUT1}$ attenuates due to regeneration. When the forward voltage of the body diode of each transistor in the full bridge circuit is defined as $V_F$, the voltage at one end of the coil L1 is $V_{DD}+V_F$ and the voltage at the other end of the coil L1 is $-V_F$. Thus, the voltage across the coil L1 is $V_{DD}+2V_F$, so that the gradient of the coil current $I_{OUT1}$ is proportional to $(V_{DD}+2V_F)/L1$.

Meanwhile, in other transition (from excitation position #2 to excitation position #3 and from excitation position #6 to excitation position #7), driving voltage $V_{OUT1}$ is applied across the coil L1 at excitation positions (#3 and #7) as the destination of transition, so that the coil current $I_{OUT1}$ varies along a gradient of $(V_{OUT1}/L1)$. $V_{OUT1}$ is $V_{DD}-I_{OUT1} \times 2R_{ON}$. The on-state resistance of each transistor in which the coil current $I_{OUT1}$ flows is represented by $R_{ON}$.

That is, due to the degree of electrical state of the coil (voltage thereacross) at the time of variation of the coil current $I_{OUT1}$, the gradient α of the downward slope of the coil current $I_{OUT1}$ in the phase switching is different from the gradient β of the downward slope of the coil current $I_{OUT1}$ out of the phase switching. For the upward slope of the coil current $I_{OUT1}$, γ≠δ is satisfied. As a result, the waveform of the coil current $I_{OUT1}$ is asymmetric, so that distortion occurs. The distortion causes unsteady rotation of the stepping motor. At excitation positions #2 and #5, regenerative current flows in each body diode, so that useless heat generation occurs in the full bridge circuit.

SUMMARY OF THE INVENTION

The present invention has been made in consideration of the problem, and a general purpose of one embodiment of the present invention is to provide a driving circuit enabling at least one of reduction of unsteady rotation of a stepping motor and reduction of heat generation of a full bridge circuit.

One embodiment of the present invention relates to a driving circuit for a stepping motor. The driving circuit includes a logic circuit structured to switch a state of a full bridge circuit including four transistors connected to a coil of the stepping motor, in accordance with an external clock. When transition is made from an excitation position at which coil current that flows in the coil is nonzero to an excitation position at which the coil current is zero, the logic circuit switches the full bridge circuit connected to the coil to (i) an inverse state where an on or off state of each of the four transistors before the transition is inverted, and then switches the full bridge circuit to (ii) an off state where all the four transistors are off.

According to the one embodiment, application of voltage across the coil with insertion of the inverse state every phase switching enables the gradient of the current varying to zero, to remain uniform. This arrangement enables reduction of distortion in the waveform of the coil current and inhibition of unsteady rotation of the stepping motor. In the inverse state, the current flows directly in the transistors instead of the body diodes thereof. Thus, loss can be reduced and heat generation of the full bridge circuit can be inhibited.

The driving circuit may further include a zero-current detection circuit structured to assert a zero-current detection signal when the coil current (absolute value) falls below a predetermined threshold value. In response to the assertion of the zero-current detection signal, the logic circuit may switch the full bridge circuit from the inverse state to the off state. The predetermined threshold value determined as near zero enables the gradient of most of the slope of the coil current to be close to the gradient in the transition with no phase switching.

The zero-current detection circuit may include a comparator structured to compare a current detection signal corresponding to a voltage drop across a detection resistor provided in the full bridge circuit, with a threshold voltage.

The driving circuit may further include: a current-value setting circuit structured to generate a current set value; and a constant-current chopper circuit structured to generate a pulse modulation signal pulse-modulated such that a detection value of the coil current comes close to a target amount based on the current set value. In accordance with the pulse modulation signal, the logic circuit may switch the two transistors of one leg of the full bridge circuit.

The constant-current chopper circuit may include: a comparator structured to compare the detection value of the coil current with a threshold value based on the current set value; an oscillator structured to oscillate at a predetermined frequency; and a flip-flop structured to output the pulse modulation signal that transitions to off-level in accordance with an output of the comparator and transitions to on-level in accordance with an output of the oscillator.

The driving circuit may be monolithically integrated on one semiconductor substrate. The "monolithic integration" includes a case where all constituent elements of the circuit are formed on the semiconductor substrate and a case where main constituent elements of the circuit are monolithically integrated. For example, for adjustment of circuit constants, part of resistors and capacitors may be provided outside the semiconductor substrate. Integration of the circuit on one chip enables reduction in circuit area and enables circuit elements to remain uniform in characteristic.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4 is a waveform chart of the coil current $I_{OUT1}$;

FIGS. 7A to 7C illustrate the state of a full bridge circuit and coil current at the time of transition from excitation position #1 to excitation position #2;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, "the state where member A is connected with member B" includes a case where member A and member B are physically directly connected together and a case where member A and member B are indirectly connected together through another member having no substantial influence on the state of electrical connection therebetween or causing no deterioration in any function or effect due to the coupling therebetween.

Similarly, "the state where member C is provided between member A and member B" includes a case where member A and member C or member B and member C are directly connected together and a case where member A and member C or member B and member C are indirectly connected together through another member having no substantial influence on the state of electrical connection therebetween or causing no deterioration in any function or effect due to the coupling therebetween.

The vertical and horizontal axes of each waveform chart or timing chart for reference in the present specification are appropriately enlarged or reduced in size for easy understanding. In addition, each illustrated waveform is simplified, overdrawn, or emphasized for easy understanding.

Figure 5:
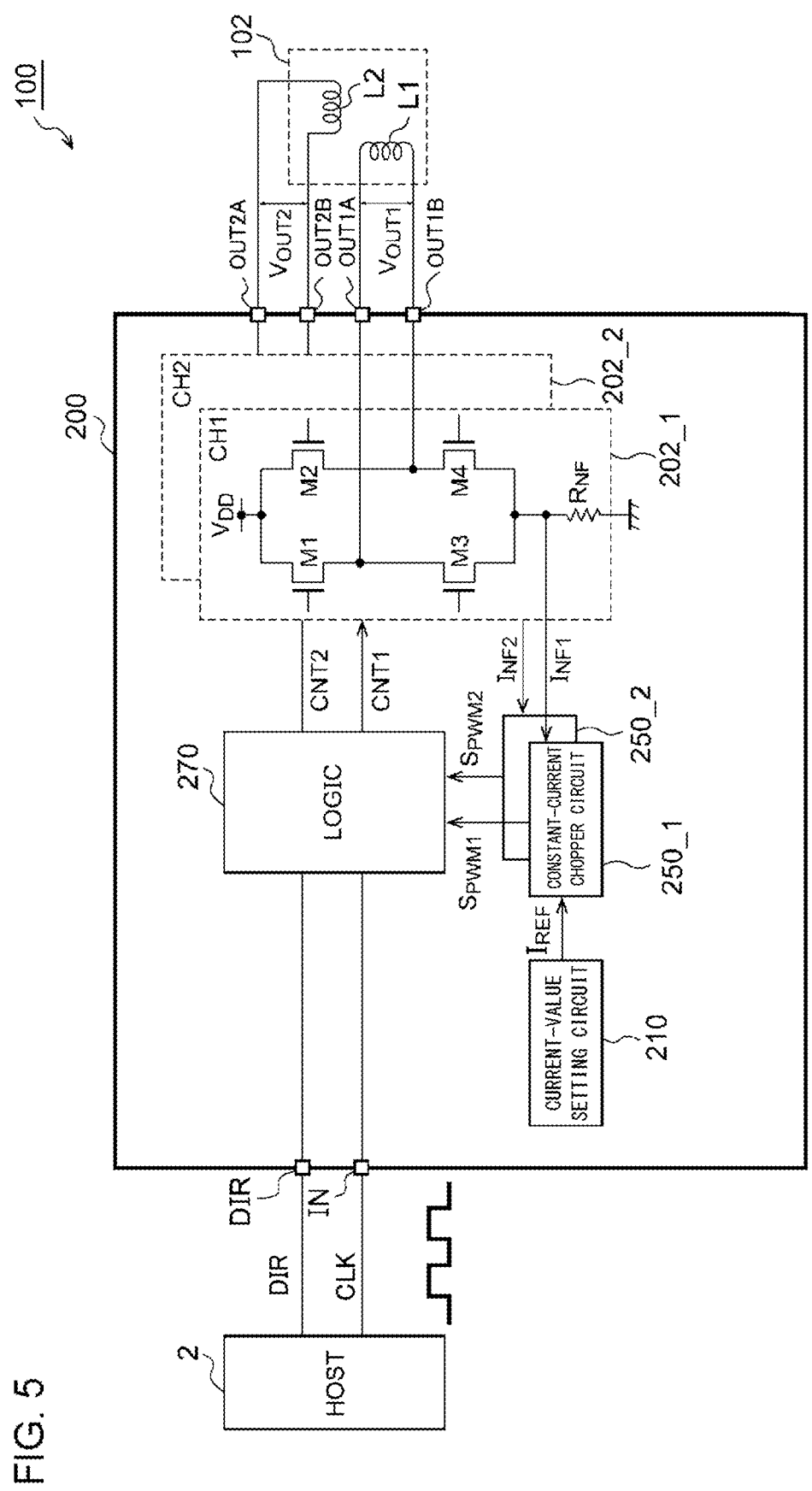
FIG. 5 is a block diagram of a motor system including a driving circuit according to an embodiment.

FIG. 5 is a block diagram of a motor system 100 including a driving circuit 200 according to an embodiment. The driving circuit 200 together with a stepping motor 102 and a host controller 2 are included in the motor system 100. The stepping motor 102 may be any of a permanent magnet (PM) type stepping motor, a variable reluctance (VR) type stepping motor, and a hybrid (HB) type stepping motor.

The driving circuit 200 has an input pin IN to which an input clock CLK is input from the host controller 2. The driving circuit 200 has a direction-instructing pin DIR to which a direction-instructing signal DIR instructing clockwise rotation (CW) or counterclockwise rotation (CCW) is input.

The driving circuit 200 rotates a rotor in the stepping motor 102 by a predetermined angle in the direction corresponding to the direction-instructing signal DIR every time the input clock CLK is input.

The driving circuit 200 including full bridge circuits 202_1 and 202_2, a current-value setting circuit 210, constant-current chopper circuits 250_1 and 250_2, and a logic circuit 270, is monolithically integrated on one semiconductor substrate.

In the present embodiment, the stepping motor 102 is a two-phase motor and includes a first coil L1 and a second coil L2. Examples of the driving system of the driving circuit 200 include 1 phase excitation, 1-2 phase excitation, and micro-step drive (e.g., W1-2 phase drive and 2W1-2 phase drive).

The full bridge circuit 202_1 as first channel CH1 is connected with the first coil L1. The full bridge circuit 202_2 as second channel CH2 is connected with the second coil L2.

The full bridge circuits 202_1 and 202_2 each are an H-bridge circuit including four transistors M1 to M4. The transistors M1 to M4 of the full bridge circuit 202_1 are switched on the basis of a control signal CNT1 from the logic circuit 270, so that the voltage $V_{OUT1}$ of the first coil L1 (also referred to as first coil voltage) is switched.

The full bridge circuit 202_2 is similar in configuration to the full bridge circuit 202_1. The transistors M1 to M4 thereof are switched on the basis of a control signal CNT2 from the logic circuit 270, so that the voltage $V_{OUT2}$ of the second coil L2 (also referred to as second coil voltage) is switched.

For simplification of the following description, the state of the full bridge circuit 202_# (#=1, 2) is defined as follows:

Off State $\varphi_0$

OUT #A and OUT #B are both in high impedance.
All M1 to M4 are off.

First State $\varphi_1$

OUT #A is high (or switched between high and low) and OUT #B is low.
M1 is on and M3 is off. (or switched complementarily)
M2 is off and M4 is on.

Second State $\varphi_2$

OUT #A is low and OUT #B is high (or switched between high and low).
M1 is off and M3 is on.
M2 is on and M4 is off (or switched complementarily).

The current-value setting circuit 210 generates a current set value $I_{REF}$. Just after the stepping motor 102 starts up, the current set value $I_{REF}$ is fixed at a predetermined value $I_{FULL}$ (referred to as a full-torque set value). The predetermined value $I_{FULL}$ may be the maximum value in the allowable range of the current set value $I_{REF}$. In this case, the stepping motor 102 is driven by full torque. This state is referred to as high torque mode.

In stable rotation of the stepping motor 102, in other words, in a case where desynchronization is less likely to occur, transition is made to high efficiency mode. In the high efficiency mode, the current-value setting circuit 210 adjusts the current set value $I_{REF}$ by feedback control, resulting in reduction of power consumption.

The full bridge circuits 202_1 and 202_2 each include a current detection resistor $R_{NF}$. The voltage drop across the current detection resistor $R_{NF}$ results in the detection value of coil current $I_L$. Note that the current detection resistor $R_{NF}$ is not limited in location, and thus may be provided closer to the power supply or may be provided in series with the coil between two outputs of the bridge circuit.

The constant-current chopper circuit 250_1 generates a pulse modulation signal $S_{PWM1}$ pulse-modulated such that the detection value $I_{NF1}$ of coil current $I_{L1}$ flowing in the first coil L1 comes close to a target amount based on the current set value $I_{REF}$ during energization of the first coil L1. The constant-current chopper circuit 250_2 generates a pulse modulation signal $S_{PWM2}$ pulse-modulated such that the detection value $I_{NF2}$ of coil current $I_{L2}$ flowing in the second coil L2 comes close to the current set value $I_{REF}$ during energization of the second coil L2.

In accordance with the pulse modulation signal $S_{PWM1}$, the logic circuit 270 switches one output of the full bridge circuit 202_1 connected to the first coil L1. In accordance with the pulse modulation signal $S_{PWM2}$ the logic circuit 270 switches one output of the full bridge circuit 202_2 connected to the second coil L2.

Every time the input clock CLK is input, the logic circuit 270 changes excitation position to switch the coil (or the paired coils) to which electric current is supplied. The excitation position is grasped as the combination of the respective coil currents of the first coil L1 and the second coil L2 in amount and direction. The excitation position may transition in accordance with the positive edge of the input clock CLK, may transition in accordance with the negative edge of the input clock CLK, or may transition in accordance with both of the positive and negative edges of the input clock CLK.

At the time of transition from the excitation position at which the coil current $I_{OUT1}$ that flows in the coil L1 is nonzero to the excitation position at which the coil current $I_{OUT1}$ is zero, the logic circuit 270 switches the full bridge circuit 202_1 connected to the coil L1 to (i) the inverse state where the on or off state of each of the four transistors M1 to M4 before the transition is inverted, and then switches the full bridge circuit 202_1 to (ii) the off state where all the four transistors M1 to M4 are off.

The configuration of the driving circuit 200 has been described above. Next, the operation of the driving circuit 200 will be described.

Figure 6:
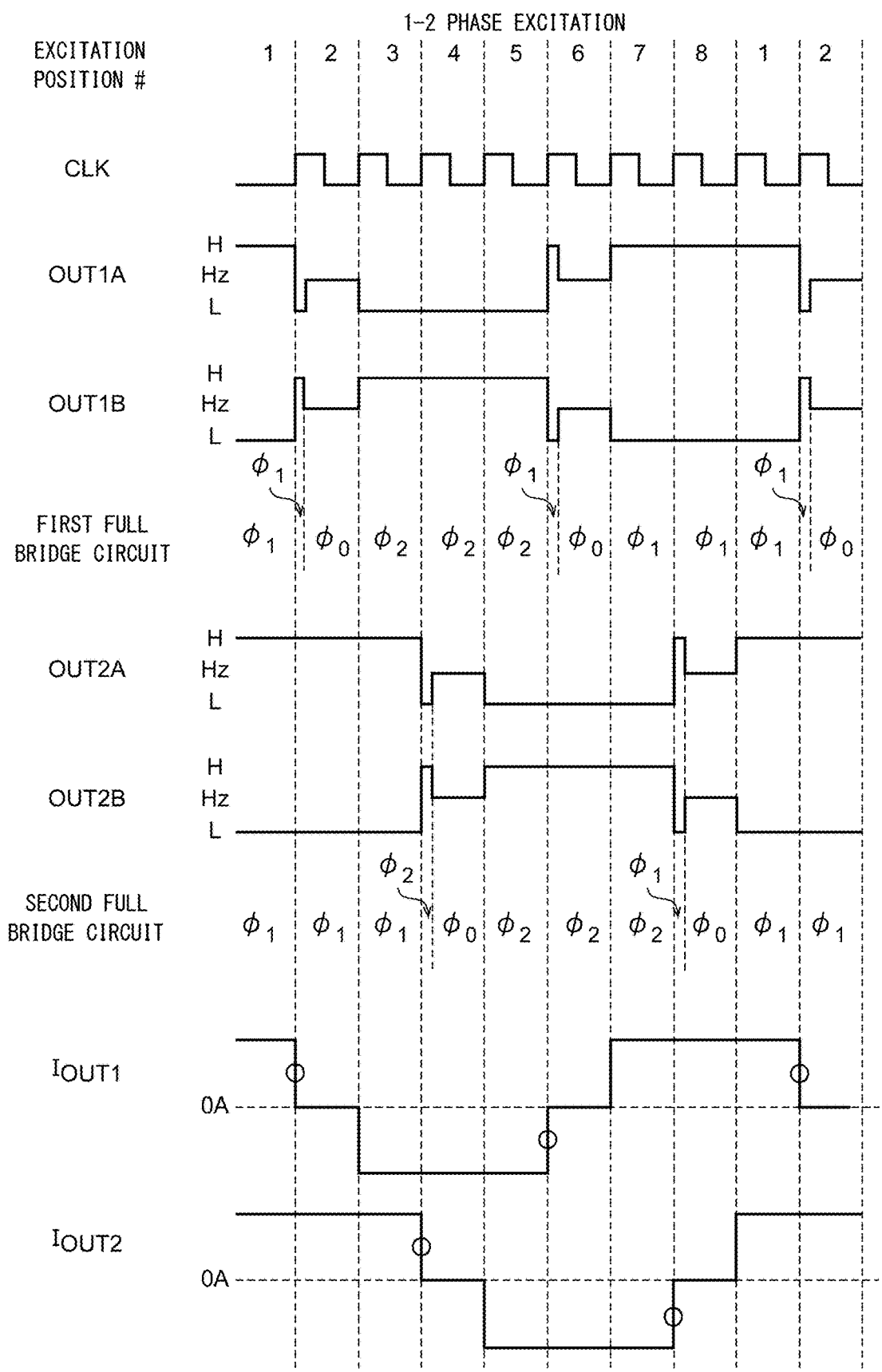
FIG. 6 is a waveform chart of the operation of the driving circuit of FIG. 5.

FIG. 6 is a waveform chart of the operation of the driving circuit 200 of FIG. 5. Herein, the 1-2 phase excitation will be described. Focus on the full bridge circuit 202_1. Focus on the transition from excitation position #1 to excitation position #2. The coil current $I_{OUT1}$ is nonzero at excitation position #1, and the coil current $I_{OUT1}$ is zero at excitation position #2. At excitation position #1 before the transition, the full bridge circuit 202_1 is in the first state $\varphi_1$. At the time of transition to excitation position #2, the full bridge circuit 202_1 is switched once to the second state $\varphi_2$ opposite to the first state $\varphi_1$, and then is switched to the off state $\varphi_0$.

Focus on the transition from excitation position #5 to excitation position #6. The coil current $I_{OUT1}$ is nonzero at excitation position #5, and the coil current $I_{OUT1}$ is zero at excitation position #6. At excitation position #5 before the transition, the full bridge circuit 202_1 is in the second state $\varphi_2$. At the time of transition to excitation position #6, the full bridge circuit 202_1 is switched once to the first state $\varphi_1$ opposite to the second state $\varphi_2$, and then is switched to the off state $\varphi_0$.

Similarly, the full bridge circuit 202_2 is controlled. Focus on the transition from excitation position #3 to excitation position #4. The coil current $I_{OUT2}$ is nonzero at excitation position #3, and the coil current $I_{OUT2}$ is zero at excitation position #4. At excitation position #3 before the transition, the full bridge circuit 202_2 is in the first state $\varphi_1$. At the time of transition to excitation position #4, the full bridge circuit 202_2 is switched once to the second state $\varphi_2$ opposite to the first state $\varphi_1$, and then is switched to the off state $\varphi_0$.

Focus on the transition from excitation position #7 to excitation position #8. The coil current $I_{OUT2}$ is nonzero at excitation position #7, and the coil current $I_{OUT2}$ is zero at excitation position #8. At excitation position #7 before the transition, the full bridge circuit 202_2 is in the second state $\varphi_2$. At the time of transition to excitation position #8, the full bridge circuit 202_2 is switched once to the first state $\varphi_1$ opposite to the second state $\varphi_2$, and then is switched to the off state $\varphi_0$.

FIGS. 7A to 7C illustrate the state of the full bridge circuit 202_1 and the current $I_{OUT1}$ at the time of transition from excitation position #1 to excitation position #2. As illustrated in FIG. 7A, at excitation position #1, the full bridge circuit 202_1 is in the first state $\varphi_1$, and the current $I_{OUT1}$ flows right in the first coil L1. The coil current $I_{OUT1}$ at this time is stabilized at a predetermined target amount.

In response to the clock CLK, transition is made to the next excitation position #2. At this time, the full bridge circuit 202_1 is switched once to the second state $\varphi_2$ as illustrated in FIG. 7B. The coil current $I_{OUT1}$ flows through the transistor M3, the coil L1, and the transistor M2 in this order. In the second state $\varphi_2$, a voltage of 0 V is applied at one end of the coil L1 and the power supply voltage $V_{DD}$ is applied at the other end of the coil L1. Thus, the voltage across the coil L1 is $V_{DD}$. The coil current $I_{OUT1}$ attenuates proportionally to the voltage across the coil.

After that, as illustrated in FIG. 7C, transition is made to the off state $\varphi_0$. If the current $I_{OUT1}$ is nonzero, the current $I_{OUT1}$ flows through the body diode D3 of the transistor M3, the first coil L1, and the body diode D2 of the transistor M2, and attenuates further, resulting in zero.

Figure 8:
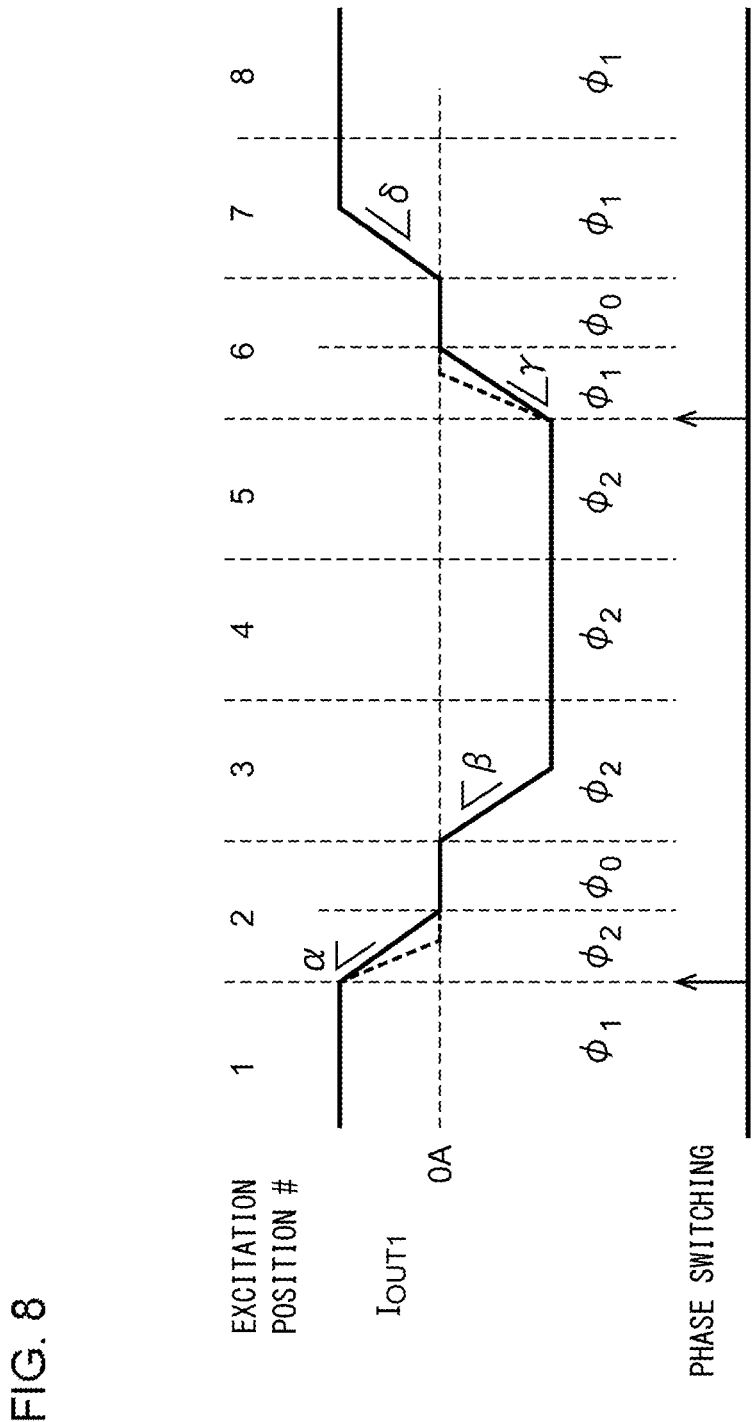
FIG. 8 is a waveform chart of the coil current.

FIG. 8 is a waveform chart of the coil current $I_{OUT1}$. A solid line indicates the waveform of the driving circuit 200 of FIG. 5, and a broken line indicates a conventional waveform. In the driving circuit 200 of FIG. 5, regardless of the presence or absence of phase switching, the full bridge circuit 202_1 is in the second state $\varphi_2$ with the coil current $I_{OUT1}$ having any downward slope, so that the electrical state of the coil L1 (voltage thereacross) is constant. Thus, the respective gradients $\alpha$ and $\beta$ of the downward slopes of the coil current $I_{OUT1}$ are identical.

Similarly, in the driving circuit 200 of FIG. 5, regardless of the presence or absence of phase switching, the full bridge circuit 202_1 is in the first state $\varphi_1$ with the coil current $I_{OUT1}$ having any upward slope, so that the electrical state of the coil L1 (voltage thereacross) is constant. Thus, the respective gradients $\gamma$ and $\delta$ of the upward slopes of the coil current $I_{OUT1}$ are identical.

As a result, all the gradients of the slopes are substantially identical ($\alpha=\beta=\gamma=\delta$), so that distortion can be reduced in the waveform of the coil current $I_{OUT1}$. A similar operation is made to the full bridge circuit 202_2, so that distortion is reduced in the waveform of the coil current $I_{OUT2}$. This arrangement enables inhibition of unsteady rotation of the stepping motor.

In addition, in the inverse state just after the transition with phase switching, the coil current $I_{OUT1}$ ($I_{OUT2}$) flows in the on-state transistors instead of in the body diodes. This arrangement enables reduction of heat generation of the full bridge circuit 202_1 (202_2).

Figure 9:
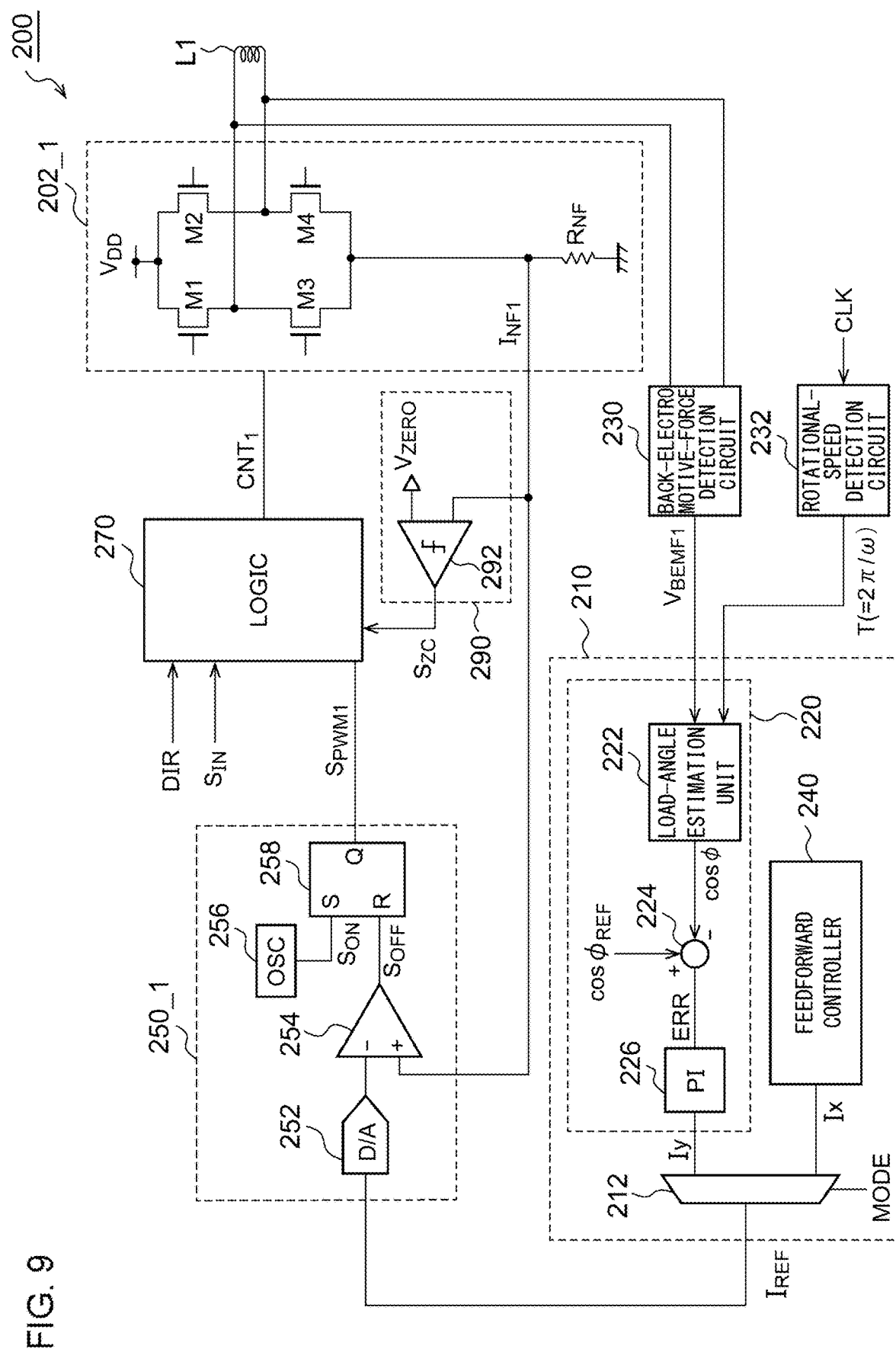
FIG. 9 is a circuit diagram of an exemplary configuration of the driving circuit.

FIG. 9 is a circuit diagram of an exemplary configuration of the driving circuit 200. FIG. 9 illustrates parts related to the first coil L1.

The current-value setting circuit 210 will be described. The current-value setting circuit 210 includes a feedback controller 220, a feedforward controller 240, and a multiplexer 212. The feedforward controller 240 outputs a fixed current set value Ix ($=I_{FULL}$) for use in the high torque mode just after start-up. The current set value Ix is set at a large value for prevention of desynchronization.

The feedback controller 220 is active in the high efficiency mode, and outputs a current set value Iy feedback-controlled on the basis of back electromotive force $V_{BEMF}$.

In accordance with a mode selection signal MODE, the multiplexer 212 selects one of the two signals Ix and Iy for output as the current set value $I_{REF}$.

The feedback controller 220 includes a load-angle estimation unit 222, a subtractor 224, a proportional-integral (PI) controller 226.

The feedback controller 220 generates the current set value Iy such that an estimated load angle $\varphi$ comes close to a predetermined target angle $\varphi_{REF}$. Specifically, the subtractor 224 generates the error ERR between a detection value $\cos \varphi$ corresponding to the load angle $\varphi$ and a target value $\cos(\varphi_{REF})$ for the detection value $\cos \varphi$. The PI controller 226 performs PI control arithmetic such that the error ERR becomes zero, to generate the current set value Iy. The processing of the feedback controller 220 can be achieved by an analog circuit including an error amplifier.

The constant-current chopper circuit 250_1 includes a D/A converter 252, a PWM comparator 254, an oscillator 256, and a flip-flop 258. The D/A converter 252 converts the current set value $I_{REF}$ into analog voltage $V_{REF}$. The PWM comparator 254 compares a feedback signal $I_{NF1}$ with reference voltage $V_{REF}$, and asserts an off-signal $S_{OFF}$ (set to high) when $I_{NF1}>V_{REF}$ is satisfied The oscillator 256 generates a periodic on-signal $S_{ON}$ that regulates chopping frequency. The flip-flop 258 outputs a PWM signal $S_{PWM1}$ that transitions to on-level (e.g., high) in accordance with the on-signal $S_{ON}$ and transitions to off-level (e.g., low) in accordance with the off-signal $S_{OFF}$.

Figure 1:
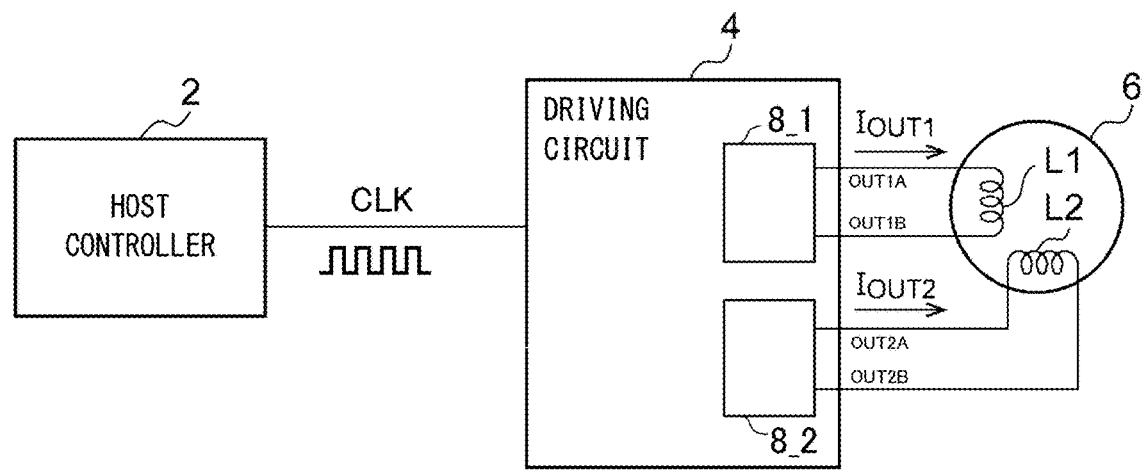
FIG. 1 is a block diagram of a motor system including a conventional stepping motor and a driving circuit therefor.
Figure 2B:
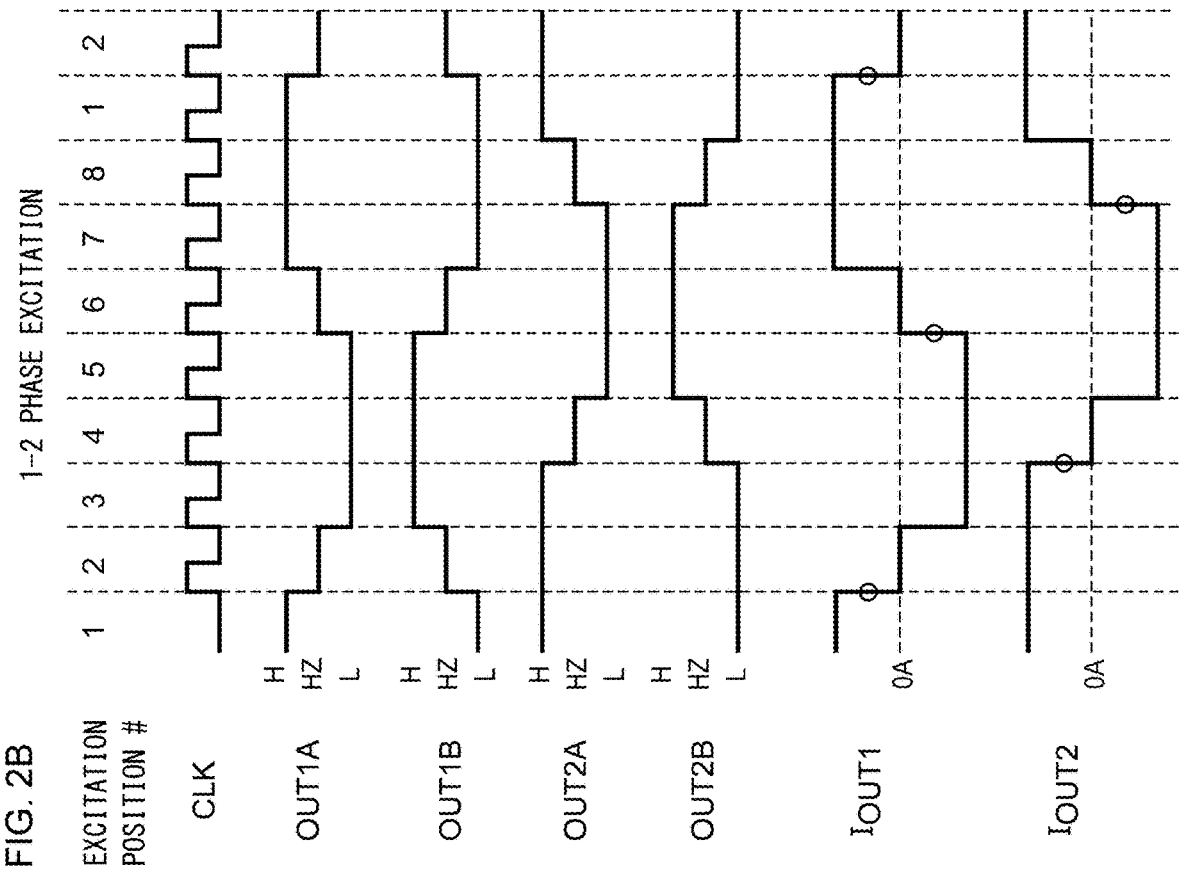
FIG. 2B is a waveform chart of the operation of the driving circuit in 1-2 phase excitation.
Figure 2A:
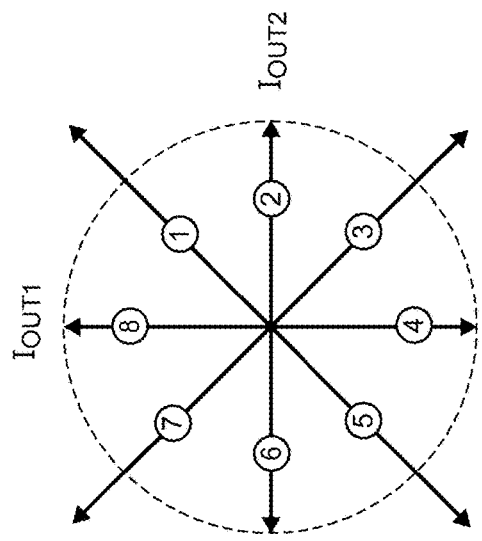
FIG. 2A explanatorily illustrates excitation position.
Figure 3A:
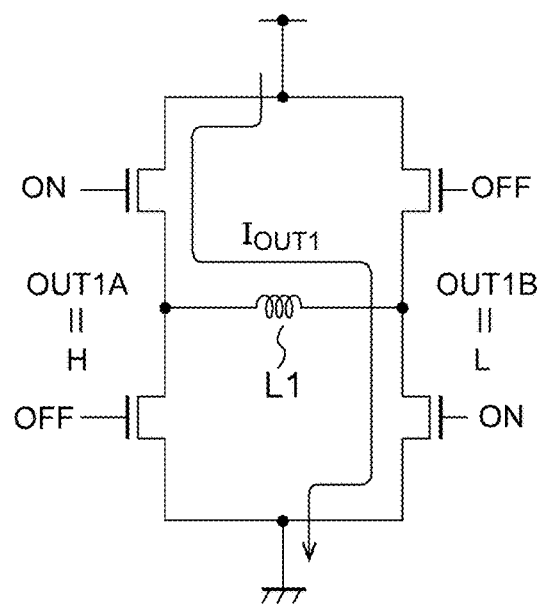
FIG. 3A illustrates the state of a full bridge circuit and current $I_{OUT1}$ at excitation position #1.
Figure 3B:
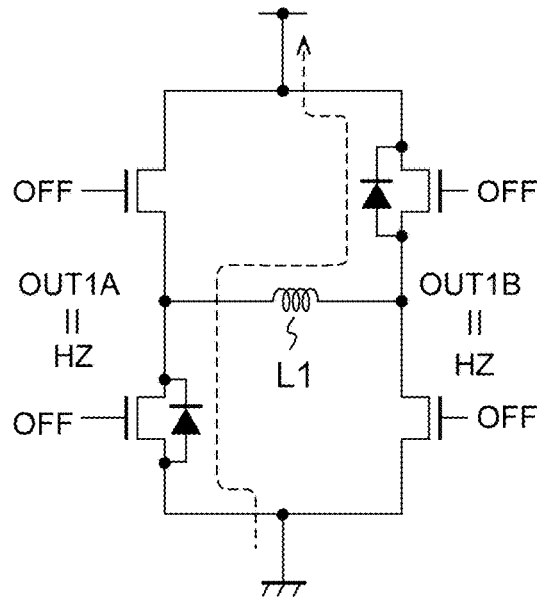
FIG. 3B illustrates the state of the full bridge circuit and the current $I_{OUT1}$ at excitation position #2.

A back-electromotive-force detection circuit 230 detects back electromotive force $V_{BEMF1}$ ($V_{BEMF2}$) across the coil L1 (L2) of the stepping motor 102. The detecting method for the back electromotive force is not particularly limited, and thus a publicly known technology may be used. In general, for acquisition of the back electromotive force, with a detection window (detection section) set and with both ends of the coil in high impedance, the voltage of the coil is sampled. For example, in the 1 phase excitation or 1-2 phase excitation, the back electromotive force $V_{BEMF1}$ ($V_{BEMF2}$) can be measured every excitation position (#2, #4, #6, and #8 of FIGS. 2A and 2B) at which high impedance occurs at one end of the coil to be monitored (output of the bridge circuit), namely, every predetermined excitation position.

A rotational-speed detection circuit 232 acquires the rotational speed (angular velocity ω) of the stepping motor 102, to generate a detection signal indicating the rotational speed ω. For example, the rotational-speed detection circuit 232 may measure the cycle T (=2π/ω) proportional to the reciprocal of the rotational speed ω and output the cycle T as the detection signal. With no desynchronization, the frequency (cycle) of an input pulse IN is proportional to the rotational speed (cycle) of the stepping motor 102. Therefore, the rotational-speed detection circuit 232 may measure the cycle of the input pulse IN or the cycle of an internal signal generated on the basis of the input pulse IN, as the detection signal.

The load-angle estimation unit 222 estimates the load angle φ, on the basis of the back electromotive force $V_{BEMF}$ and the rotation speed ω. The load angle φ corresponds to the difference between a current vector determined by the driving current that flows in the first coil L1 (namely, positional command) and the position of the rotor (mover). The back electromotive force $V_{BEMF1}$ is given by the following Expression (1)

$$V_{BEMF} = K_E \cdot \cos \varphi \quad (1)$$

where $K_E$ represents the back electromotive force constant and ω represents the rotational speed. Therefore, measurement of the back electromotive force $V_{BEMF}$ and the rotational speed ω enables generation of a detection value in correlation with the load angle φ. For example, the detection value may be cos φ. In this case, the detection value is given by Expression (2).

$$\cos \varphi = V_{BEMF} \cdot \omega^{-1} / K_E \quad (2)$$
$$= V_{BEMF} \cdot (T/2\Pi) \cdot K_E^{-1}$$

A zero-current detection circuit 290 asserts a zero-current detection signal $S_{ZC}$ (e.g., set to high) when the absolute value of the coil current $I_{OUT1}$ falls below a predetermined threshold value $I_{ZERO}$. In response to the assertion of the zero-current detection signal $S_{ZC}$, the logic circuit 270 switches the full bridge circuit 202_1 from the inverse state to the off state φ$_0$.

This arrangement is not limitative, and thus the zero-current detection circuit 290 may include a comparator 292 that compares a current detection signal $I_{NF1}$ corresponding to the voltage drop across the detection resistor $R_{NF}$ provided in the full bridge circuit 202_1, with a threshold voltage $V_{ZERO}$.

Figure 10:
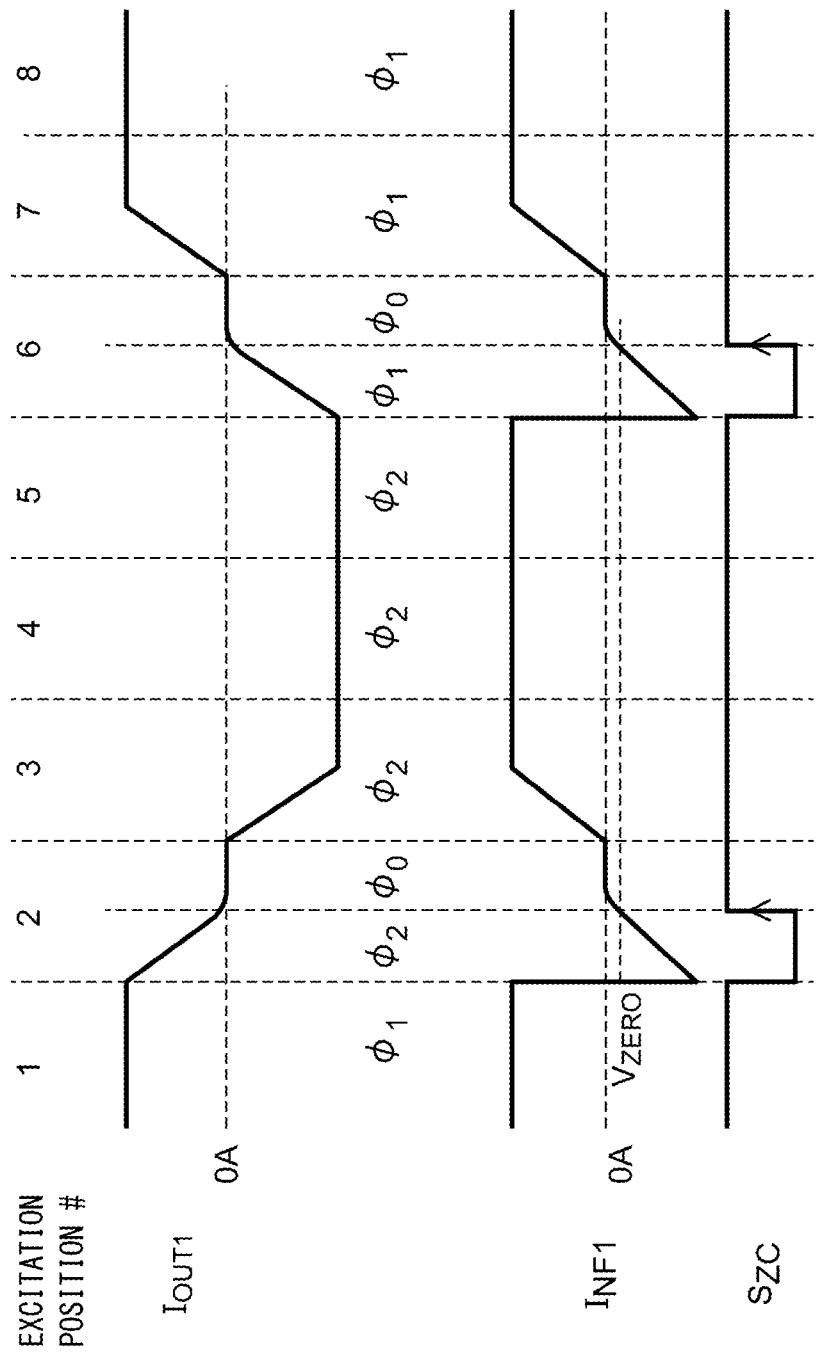
FIG. 10 is a waveform chart of the operation of the driving circuit of FIG. 9.

FIG. 10 is a waveform chart of the operation of the driving circuit 200 of FIG. 9. In the inverse state, because the coil current $I_{OUT1}$ flows in the resistor $R_{NF}$ from the ground to the power supply, the current detection signal $I_{NF1}$ is negative in voltage. Thus, as the absolute value of the coil current $I_{OUT1}$ decreases, the level in voltage of the current detection signal $I_{NF1}$ increases. Then, when the current detection signal $I_{NF1}$ crosses the threshold voltage $V_{ZERO}$ that is negative near zero, the zero-current detection signal $S_{ZC}$ is asserted, so that the full bridge circuit 202_1 is switched from the inverse state to the off state φ$_0$.

According to the driving circuit 200 of FIG. 9, the gradient α(γ) of most of the slope of the coil current $I_{OUT1}$ can be made close to the gradient β(δ) in the transition with no phase switching.

Figure 11:
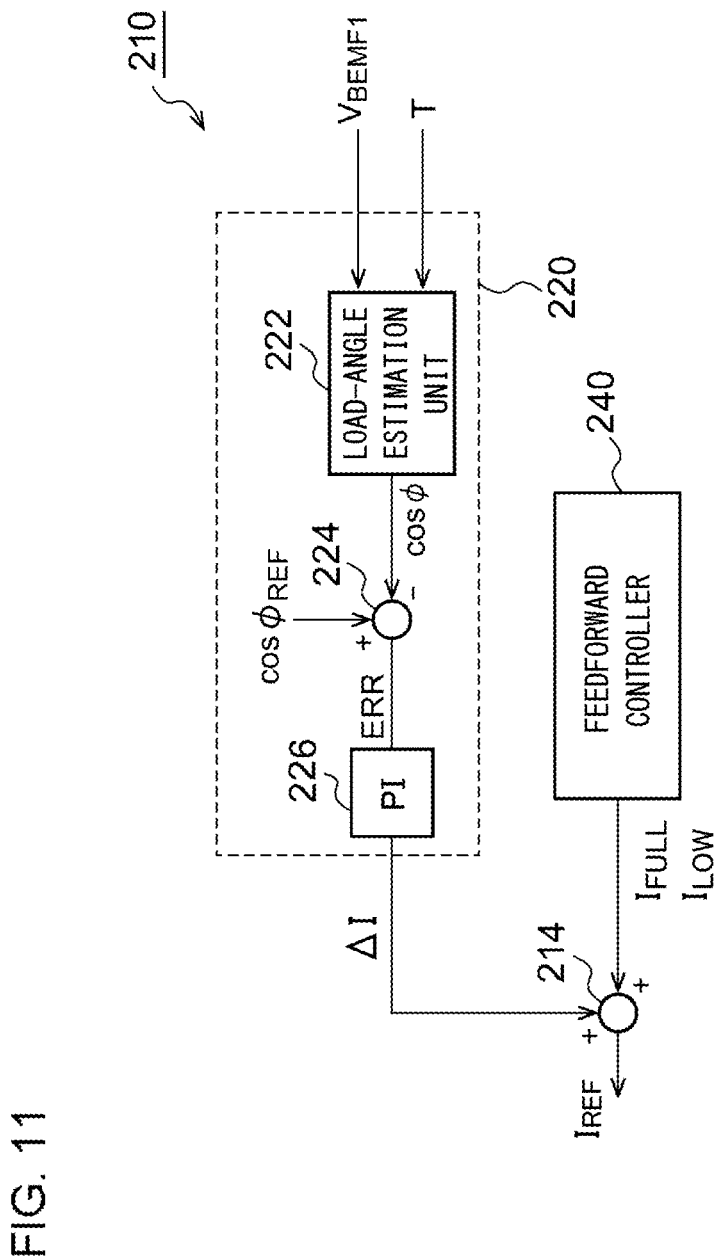
FIG. 11 illustrates another exemplary configuration of a current-value setting circuit.

FIG. 11 illustrates another exemplary configuration of the current-value setting circuit 210. The feedback controller 220 is active in the high efficiency mode, and generates a current correction value ΔI for adjustment in value such that the load angle φ comes close to the target angle φ$_{REF}$. The current correction value ΔI is zero in the high torque mode.

The feedforward controller 240 outputs a predetermined high-efficiency set value $I_{LOW}$ in the high efficiency mode. The relationship expressed by $I_{FULL}$>$I_{LOW}$ is satisfied. The current-value setting circuit 210 includes an adder 214 instead of the multiplexer 212 of FIG. 9. The adder 214 adds the current correction value ΔI to the high-efficiency set value $I_{LOW}$ generated by the feedforward controller 240. This arrangement causes the current set value $I_{REF}$=$I_{LOW}$+ΔI to be adjusted such that the load angle φ comes close to the target angle φ$_{REF}$.

Figure 12A:
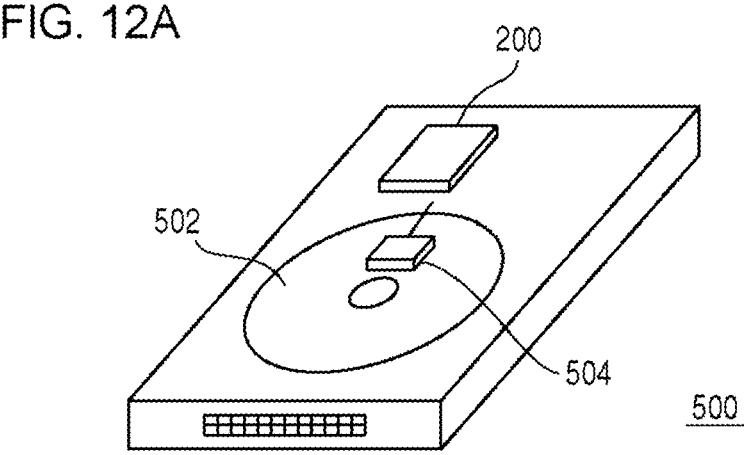
FIGS. 12A to 12C are perspective views of exemplary types of electronic equipment including the driving circuit.
Figure 12B:
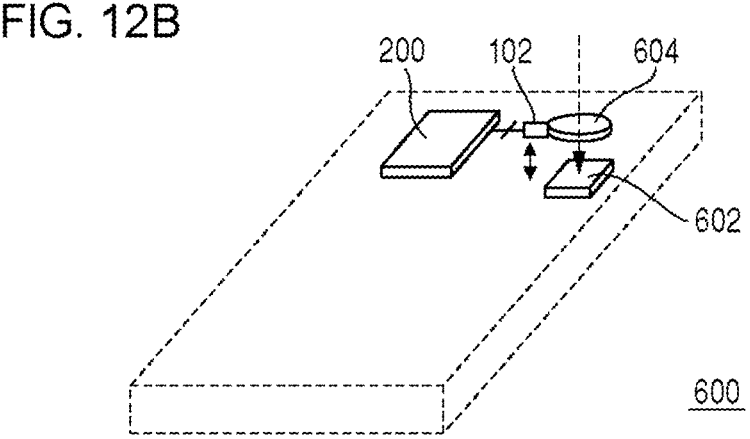
Figure 12C:
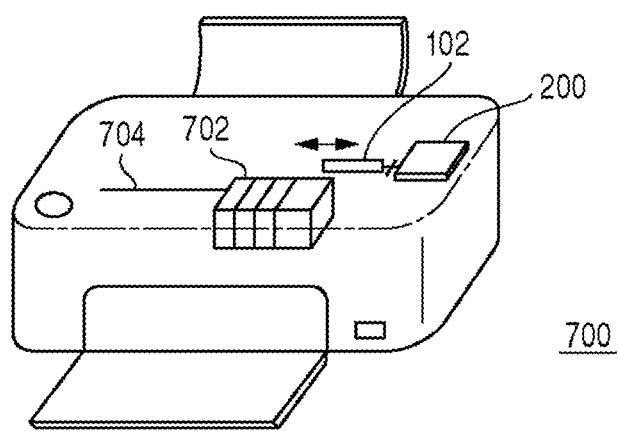

Finally, uses for the driving circuit 200 will be described. The driving circuit 200 is used in various types of electronic equipment. FIGS. 12A to 12C are perspective views of exemplary types of electronic equipment including the driving circuit 200.

The electronic equipment of FIG. 12A is an optical disc drive 500. The optical disc drive 500 includes an optical disc 502 and a pickup 504. The pickup 504 is provided to write data in and read data from the optical disc 502. The pickup 504 is movable, on the recording face of the optical disc 502, in the radius direction of the optical disc (tracking). The distance between the pickup 504 and the optical disc is variable (focusing). The pickup 504 is positioned by the stepping motor not illustrated. The driving circuit 200 controls the stepping motor. This configuration enables high-accuracy positioning of the pickup 504 with high efficiency and prevention of desynchronization.

The electronic equipment of FIG. 12B is a device 600 having an image-capturing function, such as a digital still camera, a digital video camera, or a mobile phone terminal. The device 600 includes an image capturing element 602 and a lens for autofocus 604. The stepping motor 102 positions the lens for autofocus 604. This configuration in which the driving circuit 200 drives the stepping motor 102, enables high-accuracy positioning of the lens for autofocus 604 with high efficiency and prevention of desynchronization. In addition to the lens for autofocus, the driving circuit 200 may be used for lens driving for hand-shake correction. Alternatively, the driving circuit 200 may be used for aperture control.

The electronic equipment of FIG. 12C is a printer 700. The printer 700 includes a head 702 and a guide rail 704. The head 702 is supported so as to be positioned along the guide rail 704. The stepping motor 102 controls the position of the head 702. The driving circuit 200 controls the stepping motor 102. This configuration enables high-accuracy positioning of the head 702 with high efficiency and prevention of desynchronization. In addition to the head driving, the driving circuit 200 may be used for driving of a motor for a paper feeding mechanism.

Favorably, the driving circuit 200 can be used not only in the consumer equipment illustrated in FIGS. 12A to 12C but also in industrial equipment and robots.

The embodiment of the present invention has been described above. The embodiment is exemplary, and thus persons skilled in the art should understand that various modifications may be made in combination to the constituent elements and the flows of processing in the embodiment and such modifications are to be included in the scope of the present invention. Such modifications will be described below.

Modification 1

In the driving circuit 200 of FIG. 9, transition is made from the inverse state to the off state in accordance with the zero-current detection signal $S_{ZC}$, but this is not limitative. For example, with the voltage across the coil being monitored, the coil current $I_{OUT1}$ having decreased close to zero may be detected on the basis of a result of the monitoring. Alternatively, transition may be made to the off state after predetermined time passes after transition to the inverse state.

Modification 2

In the embodiment, the case where the excitation position changes clockwise has been described. A similar manner is made at the time of counterclockwise rotation. A case where counterclockwise rotation is made in the 1-2 phase excitation will be described with reference to FIG. 2A. Regarding the current $I_{OUT1}$ (full bridge circuit 202_1), the transition from excitation position #7 to excitation position #6 and the transition from excitation position #3 to excitation position #2 involve the phase changing. Therefore, with the timing chart of FIG. 2B inverted left and right, the inverse state needs inserting in the fronts of excitation positions #6 and #2. Similarly, regarding the current $I_{OUT2}$ (full bridge circuit 202_2), the transition from excitation position #1 to excitation position #8 and the transition from excitation position #5 to excitation position #4 involve the phase changing. With the timing chart of FIG. 2B inverted left and right, the inverse state needs inserting in the fronts of excitation positions #8 and #4.

Modification 3

Figure 13B:
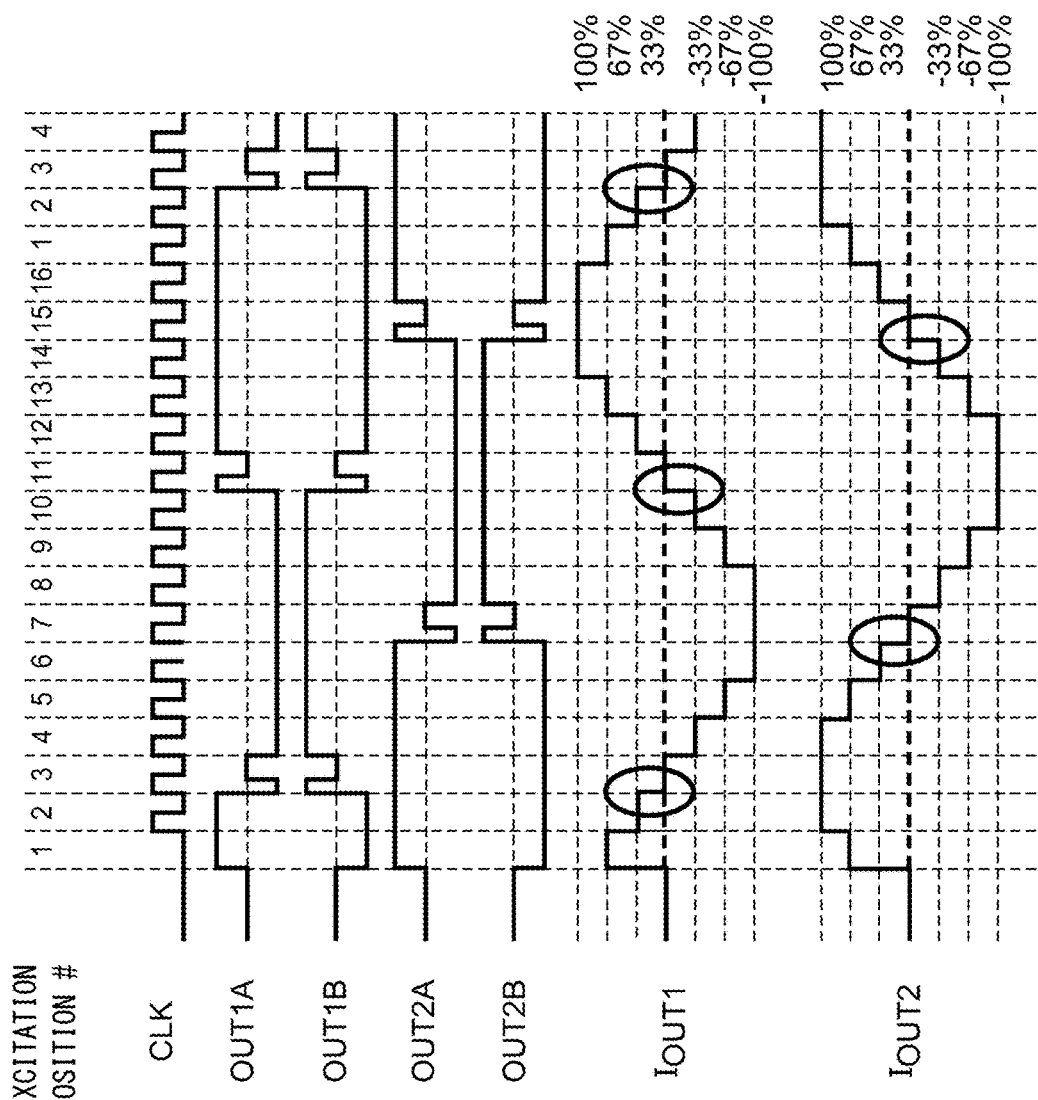
FIGS. 13A and 13B explanatorily illustrate quarter-step drive.
Figure 13A:
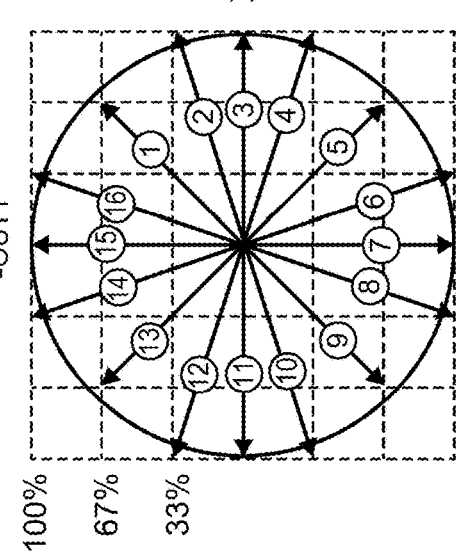

In the embodiment, the case of the 1-2 phase excitation has been described. However, the excitation method is not limited to the 1-2 phase excitation. FIGS. 13A and 13B explanatorily illustrate quarter-step drive. FIG. 13A explanatorily illustrates the excitation position of the quarter-step drive. In the quarter-step drive, an electrical angle of 360° is divided into 16 segments. Therefore, 16 excitation positions are present.

FIG. 13B is a waveform chart of the operation of the driving circuit 200 in the quarter-step drive. Focus on the coil current $I_{OUT1}$, the transition from excitation position #2 to excitation position #3 and the transition from excitation position #10 to excitation position #11 involve the phase switching. Therefore, the inverse state is inserted in the fronts of excitation positions #3 and #11. Similarly, focus on the coil current $I_{OUT2}$, the transition from excitation position #6 to excitation position #7 and the transition from excitation position #14 to excitation position #15 involve the phase switching. Therefore, the inverse state is inserted in the fronts of excitation positions #7 and #15.

Modification 4

The logic circuit 270 may adjust the power supply voltage $V_{DD}$ that is supplied to the full bridge circuit 202, instead of or together with adjustment of the duty cycle of the pulse modulation signal S2, such that the load angle φ comes close to the target angle $φ_{REF}$. Change of the power supply voltage $V_{DD}$ enables change of power that is supplied to the coils L1 and L2 of the stepping motor 102.

Modification 5

The full bridge circuit 202 may be different in chip from the driving circuit 200 or may be a discrete component.

Modification 6

The generating method for the current set value Iy in the high-efficiency mode is not limited to that described in the embodiment. For example, with a target value $V_{BEMF(REF)}$ determined for the back electromotive force $V_{BEMF1}$, a feedback loop may be provided such that the back electromotive force $V_{BEMF1}$ comes close to the target value $V_{BEMF(REF)}$.

Modification 7

In the embodiment, the currents $I_{OUT1}$ and $I_{OUT2}$ that flow in the two coils are turned on or off in accordance with the excitation position. The amounts of the currents $I_{OUT1}$ and $I_{OUT2}$ are constant regardless of the excitation position. In this case, torque varies in the 1-2 phase excitation. Instead of this control, the currents $I_{OUT1}$ and $I_{OUT2}$ may be corrected such that the torque remains constant regardless of the excitation position. For example, in the 1-2 phase excitation, the amounts of the currents $I_{OUT1}$ and $I_{OUT2}$ at excitation positions #2, #4, #6, and #8 may be $\sqrt{2}$ times as large as at excitation positions #1, #3, #5, and #7.

Modification 8

In the embodiment, the feedback controller 220 includes the PI controller, but this is not limitative. Thus, for example, the feedback controller 220 may include a PID controller.

While the preferred embodiments of the present invention have been described using specific terms, such description is for illustrative purposes only, and it is to be understood that changes and variations may be made without departing from the spirit or scope of the appended claims.

What is claimed is:

1. A driving circuit for a stepping motor, comprising:
a logic circuit structured to switch a state of a full bridge circuit including four transistors connected to a coil of the stepping motor, in accordance with an external clock; and
a zero-current detection circuit,
wherein when transition is made from an excitation position at which coil current that flows in the coil is nonzero to an excitation position at which the coil current is zero, the logic circuit switches the full bridge circuit connected to the coil to (i) an inverse state where an on or off state of each of the four transistors before the transition is inverted, and then switches the full bridge circuit to (ii) an off state where all the four transistors are off,
wherein the zero-current detection circuit structured to assert a zero-current detection signal when the coil current falls below a predetermined threshold value,
wherein the response to the assertion of the zero-current detection signal, the logic circuit switches the full bridge circuit from the inverse state to the off state, and
wherein the zero-current detection circuit includes a comparator structured to compare a current detection signal corresponding to a voltage drop across a detection resistor provided in the full bridge circuit, with a threshold voltage.

2. The driving circuit according to claim 1, wherein the driving circuit is monolithically integrated on one semiconductor substrate.

3. Electronic equipment comprising:
a stepping motor; and
the driving circuit according to claim 1, the driving circuit being structured to drive the stepping motor.

4. A driving circuit for a stepping motor, comprising:
a logic circuit structured to switch a state of a full bridge circuit including four transistors connected to a coil of the stepping motor, in accordance with an external clock;
a current-value setting circuit structured to generate a current set value; and
a constant-current chopper circuit,
wherein when transition is made from a excitation position at which coil current that flows in the coil is nonzero to an excitation position at which the coil current is zero, the logic circuit switches the full bridge circuit connected to the coil to (i) an inverse state where an on or off state of each of the four transistors before the transition is inverted, and then switches the full bridge circuit to (ii) an off state where all the four transistors are off,
wherein the constant-current chopper circuit is structured to generate a pulse modulation single pulse-modulated such that a detection value of the coil current comes close to a target amount based on the current set value, and wherein
in accordance with the pulse modulation signal, the logic circuit switches the two transistors of one leg of the full bridge circuit.

5. The driving circuit according to claim 4, wherein the constant-current chopper circuit includes:
a comparator structured to compare the detection value of the coil current with a threshold value based on the current set value;
an oscillator structured to oscillate at a predetermined frequency; and
a flip-flop structured to output the pulse modulation signal that transitions to off-level in accordance with an output of the comparator and transitions to on-level in accordance with an output of the oscillator.

6. Electronic equipment comprising:
a stepping motor; and
the driving circuit according to claim 4, the driving circuit being structured to drive the stepping motor.

7. A driving method for a stepping motor, comprising:
changing excitation position in accordance with an external clock;
controlling a state of a full bridge circuit including four transistors connected to a coil of the stepping motor, in accordance with the excitation position;
making a switch to, when transition is made from the excitation position at which coil current that flows in the coil is nonzero to the excitation position at which the coil current is zero, (i) an inverse state where an on or off state of each of the four transistors before the transition is inverted, and then making a switch to (ii) an off state where all the four transistors are off, and
asserting a zero-current detection signal when the coil current falls below a predetermined threshold value; and
switching the full bridge circuit from the inverse state to the off state in response to the asserting the zero-current detection signal.

* * * * *